United States Patent [19]

Bureller

[11] Patent Number: 5,372,464
[45] Date of Patent: Dec. 13, 1994

[54] DEVICE FOR LOCKING TOOLING ON A SUPPORT

[75] Inventor: Michel Bureller, Ozoir-La-Ferriere, France

[73] Assignee: Establissements Recoules Et Fils (S.A.), France

[21] Appl. No.: 39,219

[22] PCT Filed: Aug. 14, 1992

[86] PCT No.: PCT/FR92/00793
§ 371 Date: Apr. 14, 1993
§ 102(e) Date: Apr. 14, 1993

[87] PCT Pub. No.: WO93/03877
PCT Pub. Date: Mar. 4, 1993

[30] Foreign Application Priority Data

Aug. 14, 1991 [FR] France .................. 91 10326

[51] Int. Cl.[5] .............................. B23B 49/02
[52] U.S. Cl. ................... 408/72 B; 403/349; 408/241 B
[58] Field of Search ............... 408/72 R, 72 B, 115 B, 408/241 B; 403/322, 348, 349

[56] References Cited

U.S. PATENT DOCUMENTS

| 2,541,306 | 2/1951 | Taylor . | |
|---|---|---|---|
| 4,770,570 | 9/1988 | Tsui et al. | 408/61 |
| 4,990,022 | 2/1991 | Watanabe et al. | 403/349 |

FOREIGN PATENT DOCUMENTS

| 879749 | 3/1943 | France . |
| 2302166 | 9/1976 | France . |
| 2562179 | 10/1985 | France . |
| 2947938 | 6/1981 | Germany . |
| 3222037 | 4/1984 | Germany . |

*Primary Examiner*—Steven C. Bishop
*Attorney, Agent, or Firm*—Eckert Seamans Cherin & Mellott

[57] ABSTRACT

A device is provided for fixing and locking a tool such as a pneumatic drill on a support or grid on which are mounted sockets. According to the invention, the tool is fixed by rotation of a crown and penetrating fingers of the crown into grooves in the socket under the action of a cylinder driving a toothed sector.

15 Claims, 3 Drawing Sheets

DEVICE FOR LOCKING TOOLING ON A SUPPORT

The present invention relates to a device for locking and automatically fixing tooling on a support and particularly, but not exclusively, intended for mounting a pneumatic drill on a drilling jig.

When it is necessary to drill a large number of holes with each of them being very accurately positioned, e.g. in aviation, a known technique consists in using a drilling jig which accurately defines the positions of the holes to be made.

To this end, it is known to fix tooling to the jig so that the operation to be performed can be achieved without relative displacement between the tooling and the part to be drilled. Until now, such fixing has generally been manual in that it requires rotation of the assembly that is to be locked. An object of the present invention is to provide a fixing device that enables tooling to be fixed rigidly and automatically without any motion other than translation.

According to the present invention, the device for fixing tooling such as a pneumatic drill in a socket fixed on a support is characterized in that the front portion of the tooling includes a ring pivotally mounted on the body of the tooling and provided with at least one fastening finger capable of penetrating in a groove formed inside the socket, the ring being rotated by a toothed sector that co-operates with a rack driven by an actuator.

In this way, the tooling is presented in front of the socket in such a manner that the fastening finger(s) can penetrate into the corresponding groove of the socket and can then rotate in said groove so as to perform bayonet-type locking.

According to another characteristic of the invention, the groove of the socket comprises an axial portion for finger penetration and a helical portion extending towards the drilling jig for the purpose of clamping the tooling in the socket and consequently clamping it to the support.

Thus, rotation of the ring causes the tooling to be firmly applied against the socket and consequently against the drilling jig.

According to yet another characteristic of the invention, safety means are provided at the front of the tooling bush, which safety means may be closed by contact at the end of rotation of the helical ramp(s) and/or of the fastening fingers, such that the operating cycle of the tooling can be initialized only when the positioning of the tooling is appropriately locked.

With a pneumatic drill, such safety means is advantageously constituted by one (or more) air leaks closed only when the ring assembly of the apparatus is in contact with the socket, such closure stemming from contact between the front portion of the ring and the surface of the socket. The drill is controlled in such a manner that the tool cannot be set into rotation until the leaks have been stopped by the socket. The pneumatic pressure required for operating the tooling is obtained once the leaks are plugged. This means that the tooling can operate properly only once it is properly positioned on a socket.

According to yet another characteristic of the invention, the bush of the tooling includes at least two pegs for penetrating into orifices in the sockets, one of these preventing the tooling from rotating by compensating the torque applied thereto, while the other peg serves as keying means.

Other characteristics and advantages of the invention appear from the following description of particular embodiments given by way of non-limiting example and described with reference to the figures, in which.

Figure 1:
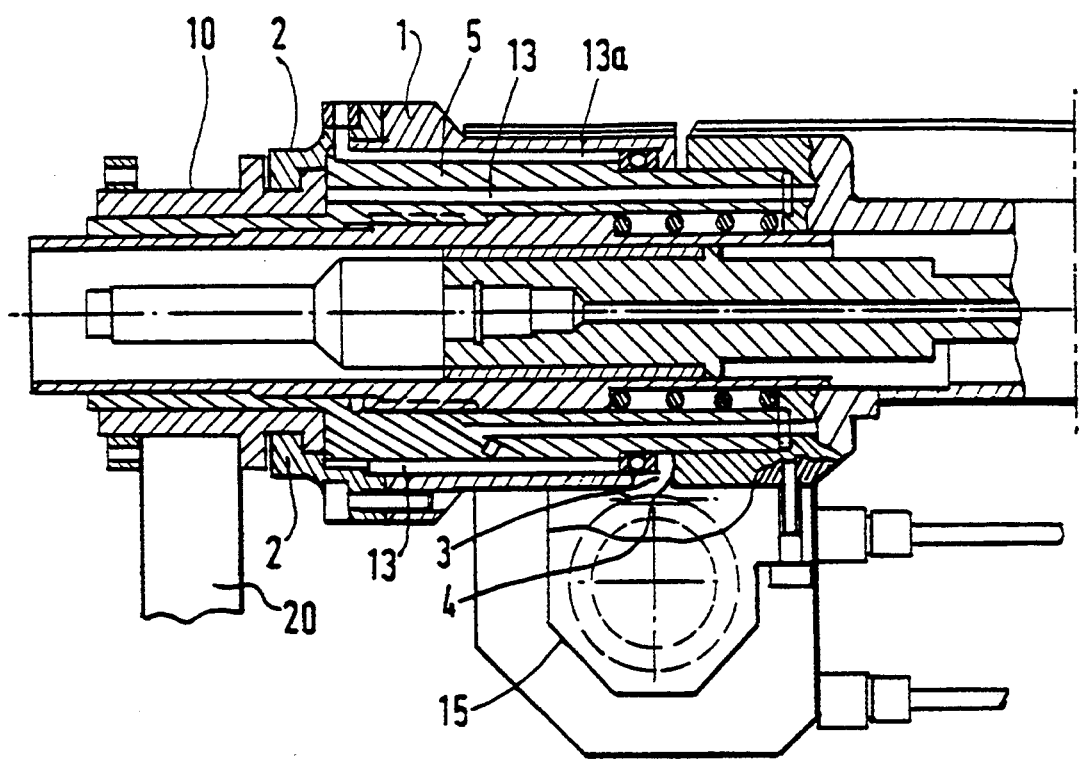
FIG. 1 is a section view through tooling provided with an attachment of the invention.

FIG. 1 shows the front portion in section of tooling fastened to a drilling jig 20 by means of a socket 10. The socket 10 is itself fixed on the drilling jig by any appropriate means, in particular such as a nut 21. The tooling has a ring-assembly 1 at its front end which is pivotally mounted on the bush 5 of the apparatus, e.g. by needle bearings, and the front portion thereof includes two fastening fingers 2 that project from the ring 1. The fastening fingers 2 are designed to penetrate in a groove and then to follow a helical ramp inside the socket 10 when the ring rotates. At the top of FIG. 1, there can be seen two leakage ducts, respectively an axial duct 13 and a radial duct 13a connected to a stage for controlling the machine or the tooling (not shown) via a tapping point. In FIG. 1, the central portion of the bush of the pneumatic drill penetrates inside the socket 10. There can also be seen a tool-carrying spindle mounted in conventional manner.

As can be seen more clearly in the following diagrams, the ring 1 is rotated by a rack-piston 4 which co-operates with a toothed sector 3 secured to the ring-assembly 1. In practice, the rotation that needs to be performed is about one-eighth of a turn in one direction or the other. The rack is actuated by an actuator 15 which, when using a pneumatic drill, is advantageously a pneumatic actuator.

Figure 2:
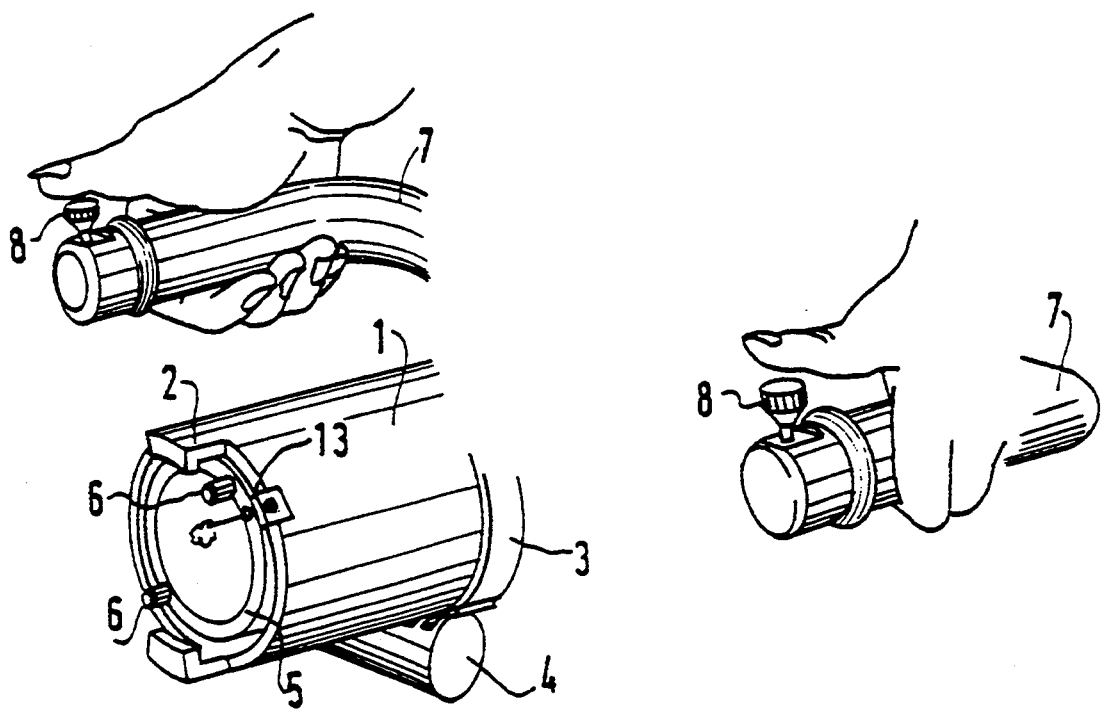
FIG. 2 is a diagram of the tooling at rest.

FIG. 2 shows the front portion of a drill at rest and under pressure. At this moment, the fastening fingers are vertical, for example, and the rack-piston 4 is fully retracted beneath the ring-assembly 1. An axial leak 13 can be seen at the front portion of the ring 1, which leak is connected to a tapping point on the control stage of the machine downstream from its pressurized air inlet (not shown). The purpose of this first leak is to control the application of the front portion of the bush against a surface of the socket 10. A radial second leak 13a is intended to control proper positioning of the fastening fingers 2. Also visible in FIG. 2, but in the leading end 5 of the apparatus, there are two pegs 6 for the purpose firstly of avoiding rotation of the machine and secondly of acting as keying means. In the embodiment shown, the machine includes two handles 7, with only the ends thereof being shown, which handles are fitted at their ends with buttons 8 for actuating the locking device. These buttons 8 control valves which are preferably connected in series so that the apparatus can be engaged only when held by both hands.

Figure 3:
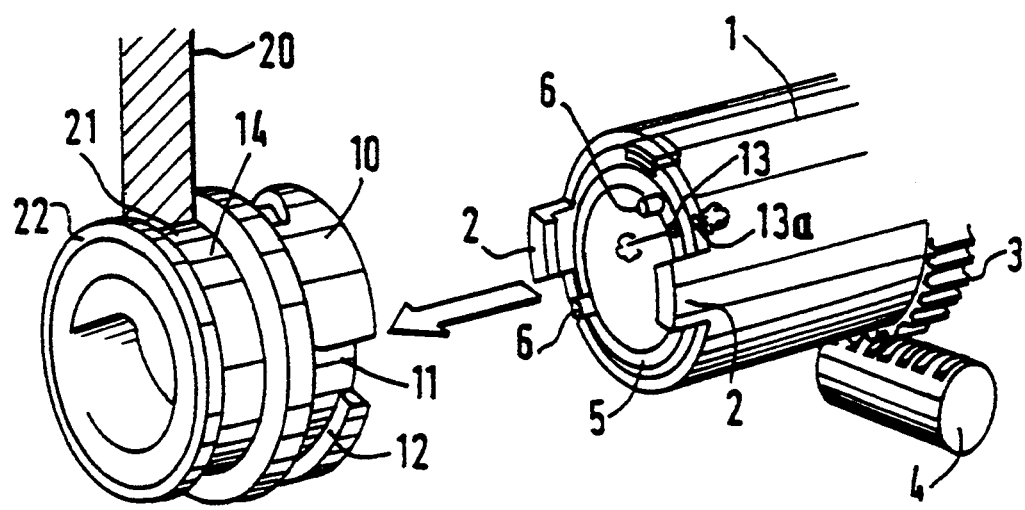
FIG. 3 is a diagram of the tooling during penetration of the drilling unit into the fastening socket.

The above-mentioned elements can also be seen in FIG. 3 which further shows the locking socket 10 which is fixed in the jig 20 by means of a groove 21 and which is locked in said jig 20 by a nut 22. As mentioned above, the outside portion of said socket 10 includes a groove that is axial in part and that continues in the form of a helical ramp 12 for the purpose of pressing the leading end 5 of the apparatus closely against the socket 10. In order to prevent use of an apparatus that is not adapted to the installed socket, two pegs 6 must penetrate into corresponding axial orifices provided in the socket and not visible in the figure. One of the pegs is common to all of the tooling, however the other peg is at a different angular offset from one piece of tooling to another so as to avoid the use of sockets that are not adapted to drills, and vice versa.

The ring 1 rotates on the leading end 5 of the apparatus by means of needle bearings, for example. As shown in FIG. 3, when both buttons 8 are in the pushed-in position, the rack 4 is moved outwards under drive from an actuator described below, thereby rotating the toothed sector 3 through one-eighth of a turn in the anticlockwise direction, thereby rotating the ring 1 and the fastening fingers 2 through the same one-eighth of a turn. The fingers can thus penetrate into the grooves 11, thereby driving the entire tooling towards the jig 20. When the buttons 8 are released, the rack is returned inwards such that the fastening fingers 12 slide along the grooves 20 to take up the vertical position that they had in FIG. 2, but now inside the grooves 12 with the leading end clamped against the socket. Under such conditions, the socket 10 closes the leaks 13 and the fingers 2 close the leaks 13a. The total pressure inside the apparatus rises, thereby enabling a conventional drilling cycle to be triggered. It may be observed that by automating the fastening of the apparatus on the jig, it is possible to use a robot for mounting such an apparatus.

Figure 4:
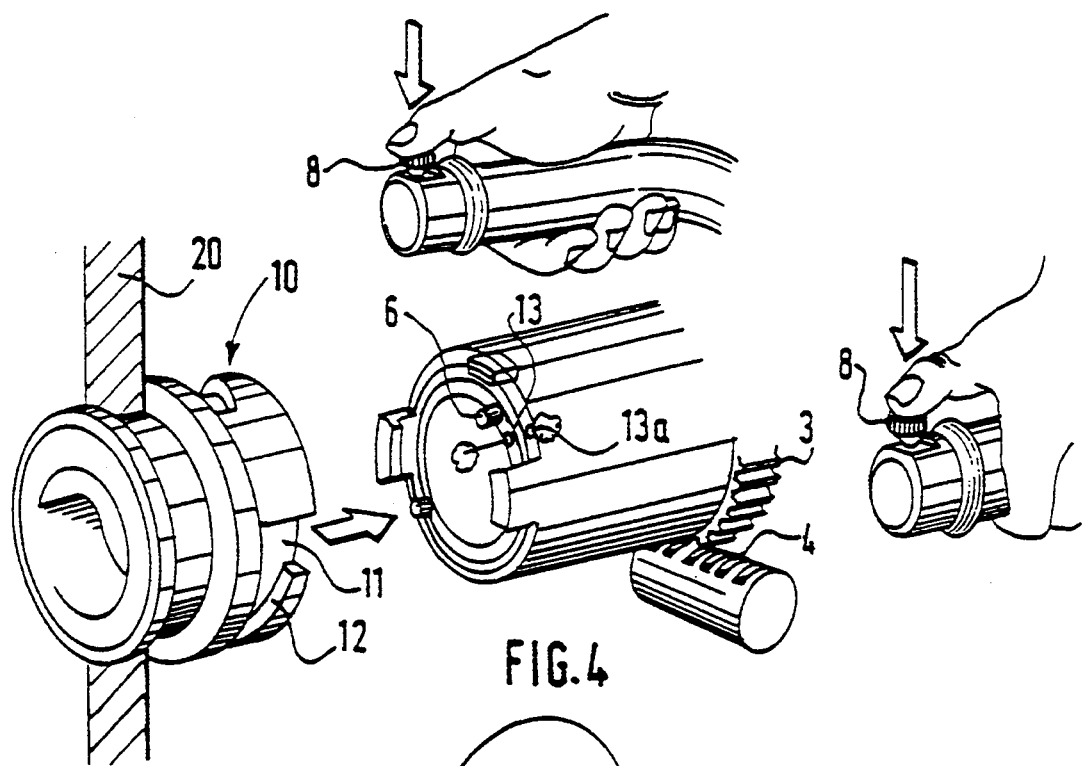
FIG. 4 is a diagram showing how the drilling unit is unlocked from the socket.

As shown in FIG. 4, after drilling and after the cycle of the apparatus has been reset, unlocking is performed by pressing again on both of the buttons 8, thereby causing the ring 1 to rotate clockwise and disengage the fastening fingers 2 from the grooves 11 and 12. Releasing the buttons 8 enables the original position to be retrieved, as shown in FIG. 2. For work performed in series, the buttons 8 can be held down until insertion into another socket, but under such circumstances, without resetting a new drilling cycle.

Figure 5:
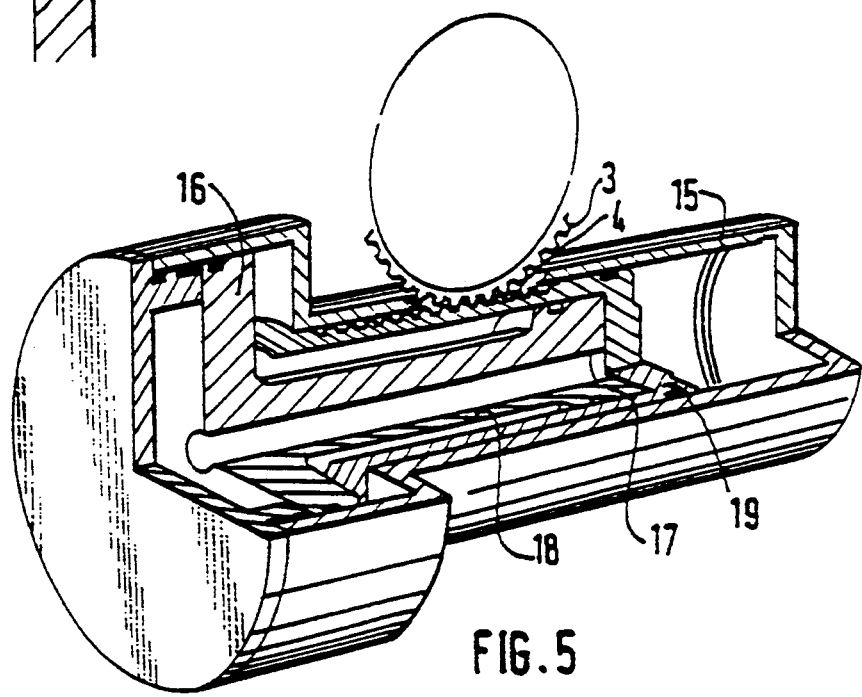
FIG. 5 is a view of the actuator for controlling rotation of the ring.

As can be seen in FIG. 5, the rack is integrated in the cylinder 15 of a differential piston actuator. On unlocking, given that jamming could take place, the piston 16 is used which is large in section, and therefore more powerful than the piston 17. The action of the unlocking piston is followed by the action of the piston 17 during angular rotation of the toothed sector 3. In contrast, for locking purposes, it is the piston 17 which is used when putting the two fastening fingers into the locking position.

The present invention thus makes it possible to have an automatic locking system that gives rise to rigid fixing on a relatively large area, thereby improving the quality of work performed by the tooling.

I claim:

1. A device for locking or fixing tooling in a socket fixed on a support, wherein the tooling has a bush and a leading portion, the leading portion of the tooling including a ring pivotally mounted on the bush of the tooling, and provided with at least one projecting fastening finger capable of penetrating in a groove of the socket, said groove comprising an axial penetration portion and a helical ramp portion, the ring being rotated by a toothed sector co-operating with a rack actuated by an actuator, and, wherein the actuator is a pneumatic actuator controlled by at least one manually depressible button situated on a handle.

2. A device according to claim 1, characterized in that two buttons are connected in series, each on a respective handle.

3. A device for locking or fixing tooling in a socket fixed on a support, wherein the tooling has a bush and a leading portion, and the bush has a leading end, the leading portion of the tooling including a ring pivotally mounted on the bush of the tooling, and provided with at least one projecting fastening finger capable of penetrating in a groove of the socket, the ring being rotated by a toothed sector cooperating with a rack actuated by an actuator, and, safety means provided at the leading end of the bush of the tooling, said safety means co-operating with a surface of the socket and with the fingers.

4. A device according to claim 3, wherein the ring has a front portion, and the safety means are constituted, when the tooling is pneumatic tooling, by leaks that are closed by contact between the front portion of the ring and the socket and by contact with the fingers.

5. A device according to claim 3, wherein the actuator is a pneumatic actuator controlled by at least one button situated on a handle.

6. A device according to claim 5, wherein two buttons are connected in series, each on a respective handle.

7. A device according to claim 3, wherein the ring is sized and arranged for pivotally mounting on the bush of a pneumatic drill.

8. A device for locking or fixing tooling in a socket fixed on a support, wherein the tooling has a bush and a leading portion, and the bush has a front surface, the leading portion of the tooling including a ring pivotally mounted on the bush of the tooling, and provided with at least one projecting fastening finger capable of penetrating in a groove of the socket, the ring being rotated by a toothed sector co-operating with a rack actuated by an actuator, and, the front surface of the bush of the tooling has at least one peg that penetrates in a corresponding orifice of the socket, thereby preventing the bush from rotating.

9. A device according to claim 8, further comprising a second peg angularly offset from the first peg, providing assembly security.

10. A device according to claim 8, wherein the actuator is a pneumatic actuator controlled by at least one button situated on a handle.

11. A device according to claim 10, wherein two buttons are connected in series, each on a respective handle.

12. A device according to claim 8, wherein the ring is sized and arranged for pivotally mounting on the bush of a pneumatic drill.

13. A device for locking or fixing tooling in a socket fixed on a support, wherein the tooling has a bush and a leading portion, the leading portion of the tooling including a ring pivotally mounted on the bush of the tooling, and provided with at least one projecting fastening finger capable of penetrating in a groove of the socket, the ring being rotated by a toothed sector co-operating with a rack actuated by an actuator, the actuator being a pneumatic actuator controlled by at least one button situated on a handle, and the actuator includes a differential piston, the piston providing unlocking.

14. A device according to claim 13, wherein two buttons are connected in series, each on a respective handle.

15. A device according to claim 13, wherein the ring is sized and arranged for pivotally mounting on the bush of a pneumatic drill.

* * * * *